United States Patent [19]

Usui

[11] Patent Number: 5,086,338
[45] Date of Patent: Feb. 4, 1992

[54] COLOR TELEVISION CAMERA OPTICAL SYSTEM ADJUSTING FOR CHROMATIC ABERRATION

[75] Inventor: Fumiaki Usui, Kanagawa, Japan

[73] Assignee: Canon Kabushiki Kaisha, Tokyo, Japan

[21] Appl. No.: 433,988

[22] Filed: Nov. 9, 1989

[30] Foreign Application Priority Data

Nov. 21, 1988 [JP] Japan .................. 63-295636
Dec. 15, 1988 [JP] Japan .................. 63-317243

[51] Int. Cl.⁵ .................................. H04N 9/093
[52] U.S. Cl. ............................. 358/41; 558/55; 558/51
[58] Field of Search ............... 358/50, 51, 55, 173, 358/213.13, 225, 226, 44; 350/173, 447, 295

[56] References Cited

U.S. PATENT DOCUMENTS

| | | | |
|---|---|---|---|
| 3,802,763 | 4/1974 | Cook et al. | 350/173 |
| 3,976,363 | 8/1976 | Toyaha et al. | 350/173 |
| 4,164,752 | 8/1979 | Doi et al. | 358/55 |
| 4,521,804 | 6/1985 | Bendell | 355/51 |

FOREIGN PATENT DOCUMENTS

| | | |
|---|---|---|
| 89009850 | 1/1989 | France . |
| 1810034 | 4/1943 | Japan . |
| 60-144703 | 7/1985 | Japan . |
| 61187485 | 8/1986 | Japan . |
| 1166688 | 6/1989 | Japan . |
| 1204588 | 8/1989 | Japan . |

Primary Examiner—James J. Groody
Assistant Examiner—Ho Tuan V.
Attorney, Agent, or Firm—Fitzpatrick, Cella, Harper & Scinto

[57] ABSTRACT

A color television camera for converting an image formed by an objective lens into video signals is contructed with inclusion of a prism for splitting light having passed through the objective lens into a plurality of color components, and a lens unit arranged in between the prism and at least one of a plurality of solid-state image pickup means and having such an optical power that the sizes of the images of all the color components are made coincident with one another.

16 Claims, 5 Drawing Sheets

COLOR TELEVISION CAMERA OPTICAL SYSTEM ADJUSTING FOR CHROMATIC ABERRATION

BACKGROUND OF THE INVENTION

1. Field of the Invention:

This invention relates to an optical system for a video camera, a television camera, etc. and, more particularly, to an optical system for the imaging apparatus using a color separation prism.

2. Description of the Related Art:

In the color television camera, the light beam having passed through the objective lens is split into three parts of different colors, i.e., red, green and blue, by the color separation prism, and their images are formed on the respective image pickup elements, from which a color signal is obtained.

Since the objective lens has usually a lateral chromatic aberration, the images for the different channels delicately differ in size from one another. This leads to a phenomenon that the three color images on the television display fail to exactly coincide with one another, that is, the so-called registration error is produced. In the conventional camera employing the image pickup tube, the registration error can be removed by electrically controlling the deflection of the electron beams in accordance with the lateral chromatic aberration the used lens has.

In recent years, however, the solid-state image pickup element has found its use in a rapidly increasing numbers of cameras. Since, in this case, the three elements are arrayed in a fixed geometry, the conventional way of correcting the registration can no longer be employed. Therefore, the lateral chromatic aberration of the objective lens reveals itself on the television display. Because of this, color deviation takes place in the margin of the display, causing the image quality to deteriorate.

From this reason, the objective lens for the camera using the solid-state image pickup elements must be better corrected for lateral chromatic aberration than was heretofore accepted. Hence, there are tendencies to use very expensive glasses of high extraordinary partial dispersion, and of increasing the number of constituent lenses while ignoring the increase of the size of the entire optical system.

As related art, mention may be made of those disclosed in U.S. Pat. Nos. 3,802,763 and 3,976,363.

SUMMARY OF THE INVENTION

A first object of the present invention is to provide an optical system which enables good color pictures to be obtained.

A second object of the present invention is to provide an optical system for a television camera in which the error of registration is corrected.

To achieve these objects, a color television camera for converting an image formed by an objective lens into video signals of the invention is constructed with inclusion of a prism for splitting light having passed through the objective lens into a plurality of color components, a plurality of solid-state image pickup elements, and at least one lens unit arranged in between the prism and one of the plurality of solid-state image pickup elements and having such an optical power that the sizes of all images formed with the respective color components are brought into coincidence with each other.

DETAILED DESCRIPTION OF THE PREFERRED EMBODIMENTS

Figure 1:
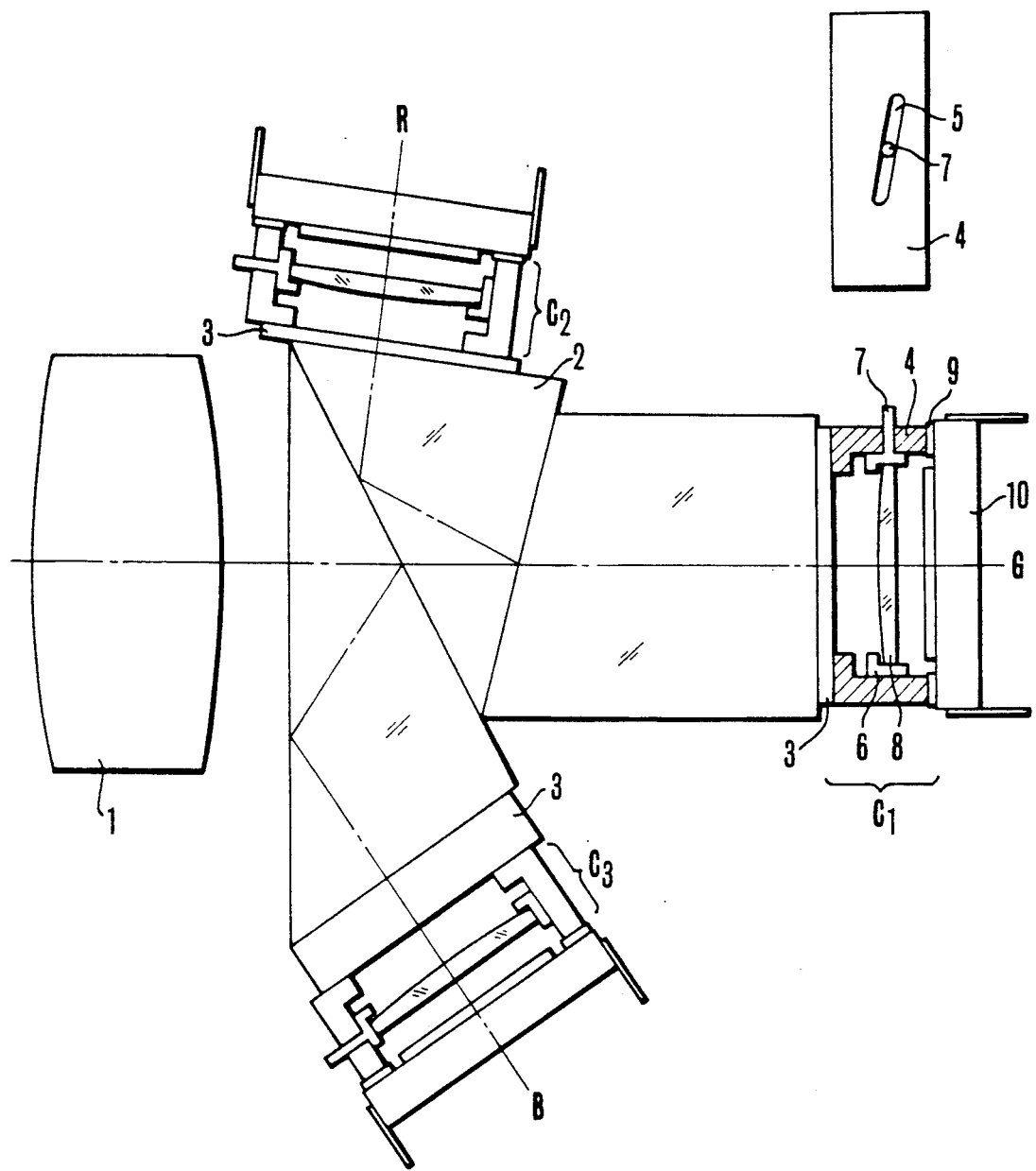
FIG. 1 is a schematic view of a first embodiment of the invention.

In FIG. 1, there is shown a first embodiment of the invention in which a lens element of weak refractive power is arranged in between the color separation prism and each of the solid-state image pickup elements, and the lens position for each channel is finely changed, thereby making it possible to correct the residual lateral chromatic aberration of the objective lens.

In the figure, reference numeral 1 denotes an objective lens for forming images of an object on the solid-state image pickup elements which convert the images into video signals. The objective lens 1 is attachable to, and detachable from, the camera body. The image-bearing light beam from the objective lens 1 is split into three color components, i.e., red, blue and green ones, by a color separation prism 2. Of the three color components assigned to the respective regions of the spectrum, the excessive light components are cut off by trimming filters 3.

Since a correction unit $C_1$ shown by reference numerals 4 to 10 is in common with other two channels, the green channel is chosen as the representative for explanation.

A mounting member 4 of tubular shape carries a correction lens unit 8. One end of the tube 4 is fixedly secured to the trimming filter by an adhesive agent, the opposite end of which is fixedly secured to a solid-state image pickup element 10 by solder representative of an adhesive agent 9. In the mounting member 4, a material whose thermal expansion coefficient is very close to that of the color separation prism 2 is selected, because if, as the ambient temperature changes, the relative position of the solid-state image pickup element 10 to the color separation prism 2 deviates from the ideal one, a wrong registration occurs. As it has a close thermal expansion coefficient to that of glass, titanium or ceramics can be used.

A lens holding cell 6 is fitted in the inner diameter of the mounting member 4 so that it slides along an optical axis G. In the inside of the lens holding cell 6, there is fixedly mounted a correction lens unit 8 of weak refractive power. A radial pin 7 is fixedly mounted on the outer periphery of the lens holding cell 6, and extends into, and protrudes outwardly of, an inclined cam slot 5 bored through the wall of the mounting member 4. When the operator moves the pin 7 along the cam slot 5 to rotate the lens holding cell 6, the correction lens unit 8 moves along the optical axis G forward or rearward.

Figure 2:
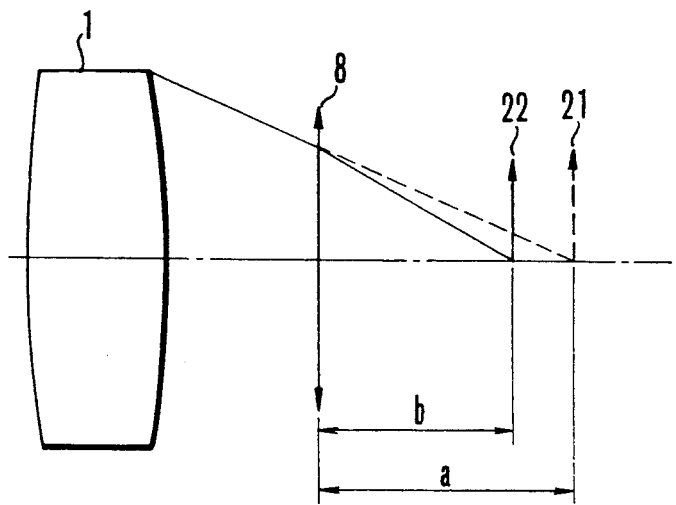
FIG. 2 is a diagram to explain the optical principle of the invention.

Next, variation of the magnification with variation of the distance between the solid-state image pickup element and the lens is described by reference to FIG. 2.

Suppose the objective lens 1 without the correction lens unit 8 forms an image 21, then when the correction lens unit 8 is used, the image is shifted to an image 22 at a changed magnification. The image receiving surface of the solid-state image pickup element is put in registry with the plane of the image 22. Letting the distance from the correction lens unit 8 to the plane of the image 21 be denoted by "a", the distance from the correction lens unit 8 to the plane of the image 22 by "b", and the image magnification owing to the correction lens unit 8 by "m", from the well known formulas, the following relationships are obtained:

$$1/a + 1/b = 1/f \quad (1)$$

$$m = b/a \quad (2)$$

From these equations, by eliminating "a", the following relationship is obtained:

$$m = (f - b)/f \quad (3)$$

Let us now consider a case where the residual lateral chromatic aberration of an objective lens 1 causes the red and blue images to become larger than the green image by 0.1% (or 5.5 μm at the image height of 5.5 mm). And, the correction lens unit 8 of weak power is assumed to lie within a range of distances of 5 mm–10 mm. When the focal length of the correction lens unit 8 is chosen at 200 mm to 3000 mm, the distance "b" from the correction lens unit 8 to the image receiving surface of the image pickup element is evaluated as follows:

Numerical Example 1:
  In the case of f=200 mm,
  Green Channel: b=5 mm
  Red and Blue Channels: b=5.2 mm.
Numerical Example 2:
  In the case of f=1000 mm.,
  Green Channel: b=5 mm
  Red and Blue Channels: b=6 mm
Numerical Example 3:
  In the case of f=3000 mm,
  Green Channel: b=5 mm
  Red and Blue Channels: b=8.3 mm In the case of a weaker refractive power than f=3000 mm, the use of such a correction lens unit 8 effects almost no result of changing the imaging performance. To correct the registration, however small it is, therefore, the correction lens unit 8 and the solid-state image pickup element must be spaced apart to a large distance. This is disadvantageous at the economy of space. Hence, the correction lens unit 8 has to be designed by choosing an optimum focal length from the relationship of the residual lateral chromatic aberration to be corrected and the available space.

Conversely when the refractive power of the correction lens unit 8 is much strong, the correction lens unit 8 itself produces aberrations, particularly, a curvature of field, adversely affecting the imaging performance. Further, even the image size itself is caused to change. This leads to a change in the angle of view too. In order that the change in the angle of view is virtually not appreciable, there is a need to limit the change of the image magnification resulting from the use of the correction lens unit 8 to not more than 5%.

In the ordinary television camera, the proper range is found to be 3000 mm > |f| > 200 mm.

Though, in the foregoing embodiment, all the three channels have their correction lens units 8 made movable along the respective optical axes, one channel may otherwise have its correction lens unit fixed, provided that this channel can be used as the reference for adjusting the magnifications of the other two channels.

Further, though the method of moving the correction lens unit has been illustrated by means of the cam, another method may be used which is either by the helicoid screw, or to insert a wedge, or to electrically drive by the piezoelectric element, or to adjust the dimensions by spacers.

By the way, the movement of the correction lens unit to change the image magnification is usually accompanied by a shift of the image plane of sharp focus. But, in the case of a small change like that for adjustment of the registration, as it falls within the depth of focus, the shift of the image plane may be ignored. For example, in the case of the numerical example 1, the image planes of the green channel and the red and blue channels shift only 0.01 mm. So this value is in the negligible order.

Though, in this embodiment, the correction lens unit 8 has been made arranged to move for the purpose of continuously adjusting the registration, it is needless to say that the correction lens unit 8 of each channel may otherwise be fixed in the previously determined position at which the lateral chromatic aberration of the objective lens can be corrected. In this case, though fine adjustment is impossible, holding is stable.

Figure 3:
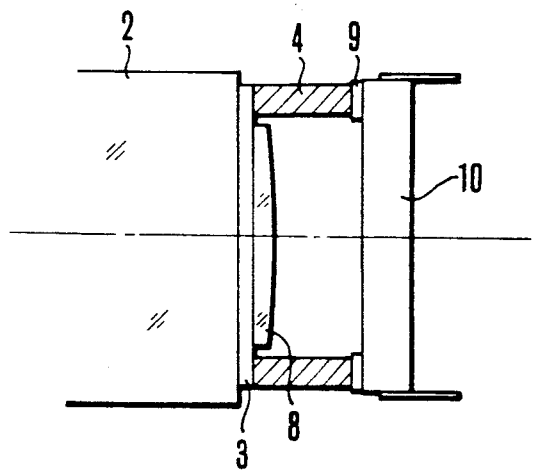
FIG. 3 illustrates only one of the channels of a second embodiment of the invention.

In FIG. 3, there is shown a second embodiment of the invention wherein the refractive power of the correction lens unit 8 of each channel is previously determined to correct the residual lateral chromatic aberration of the objective lens. Though FIG. 3 shows the emerging portion of only one channel, the other channels have a similar construction.

The correction lens unit 8 in FIG. 3 is fixed directly to the trimming filter.

To correct, likewise as in the before-described example, the 0.1% lateral chromatic aberration of the objective lens, for example, the following numerical examples are possible. Any of them is given for the case of 5 mm in the distance from the lens vertex to the image receiving surface of the image pickup element.

Numerical Example 4:
  Green Channel: f=200 mm;
  Red and Blue Channels: f=192.1 mm
Numerical Example 5:
  Green Channel: f=1000 mm;
  Red and Blue Channels: f=833.3 mm
Numerical Example 6:
  Green Channel: f=3000 mm;
  Red and Blue Channels: f=1873.8 mm
Numerical Example 7:
  Green Channel: f=∞;
  Red and Blue Channels: f=5000 mm Though, in this embodiment, it is to the color separation prism that the correction lens unit 8 is fixedly secured, it is needless to say that the correction lens unit 8 may be made held on the solid-state image pickup element, or carried by the mounting member 4. Since if the distance between the correction lens unit 8 and the image receiving surface deviates from the designed one, the registration is caused to err, it is better to let it be held on that part which is less susceptible to the error.

In a case where the refractive power of the correction lens unit is made to vary from channel to channel as in this embodiment, because the lens position is not always necessary to alter, the refractive power may be very weak. So one channel may be with a plane glass.

It is also valuable to make provision for finely adjusting the registration by otherwise arranging the correction lens unit 8 to be movable as in the first embodiment. It is also possible to impart a weak curvature to the trimming filter itself so that it gets the function of the correction lens unit 8.

Further, though the foregoing has been described in connection with the correction lens units 8, all of which have the form of a positive lens, it is needless to say that even with a negative lens, a similar result is obtained. Further, though the correction lens unit has been illustrated as a single lens, it may be constructed from a plurality of lenses.

Next, another embodiment of the invention in which on considering that the objective lens is a zoom lens, a more accurate control is made, is described below.

Figure 4:
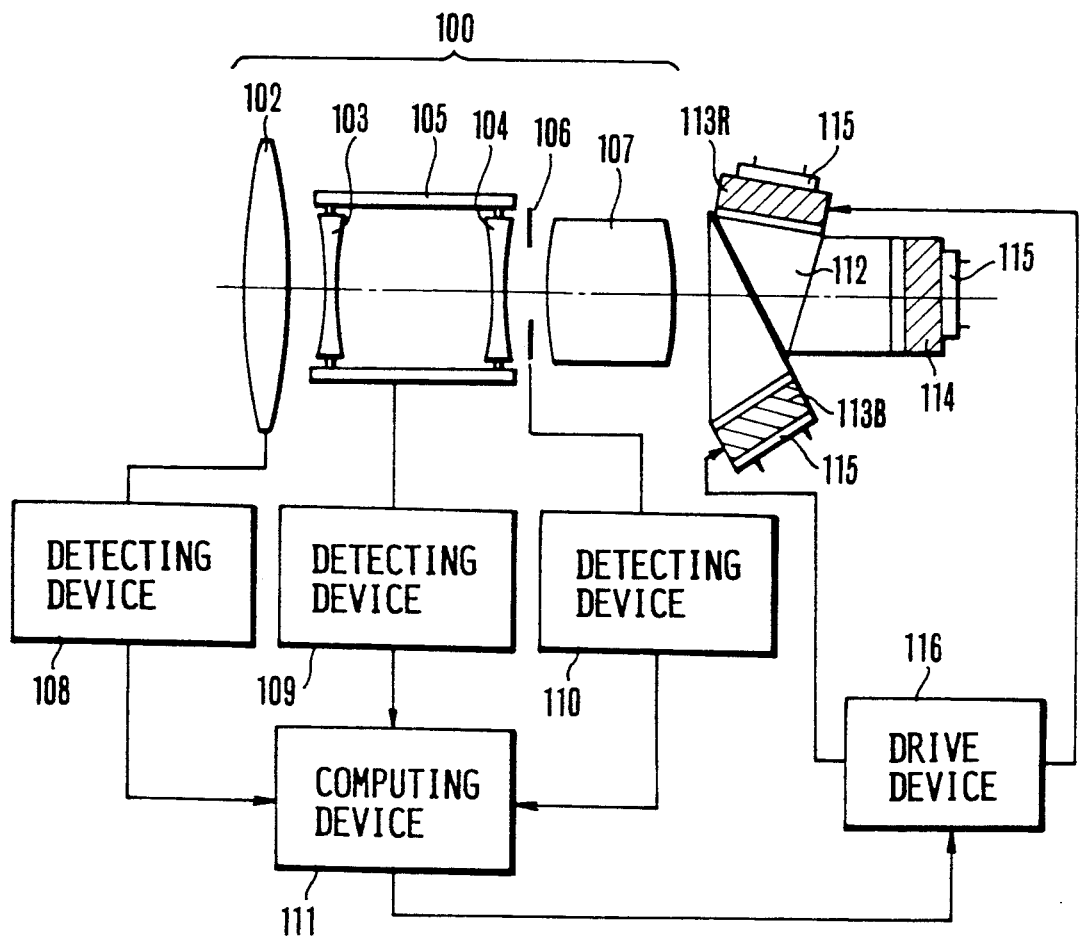
FIG. 4 illustrates a third embodiment of the invention.
Figure 5:
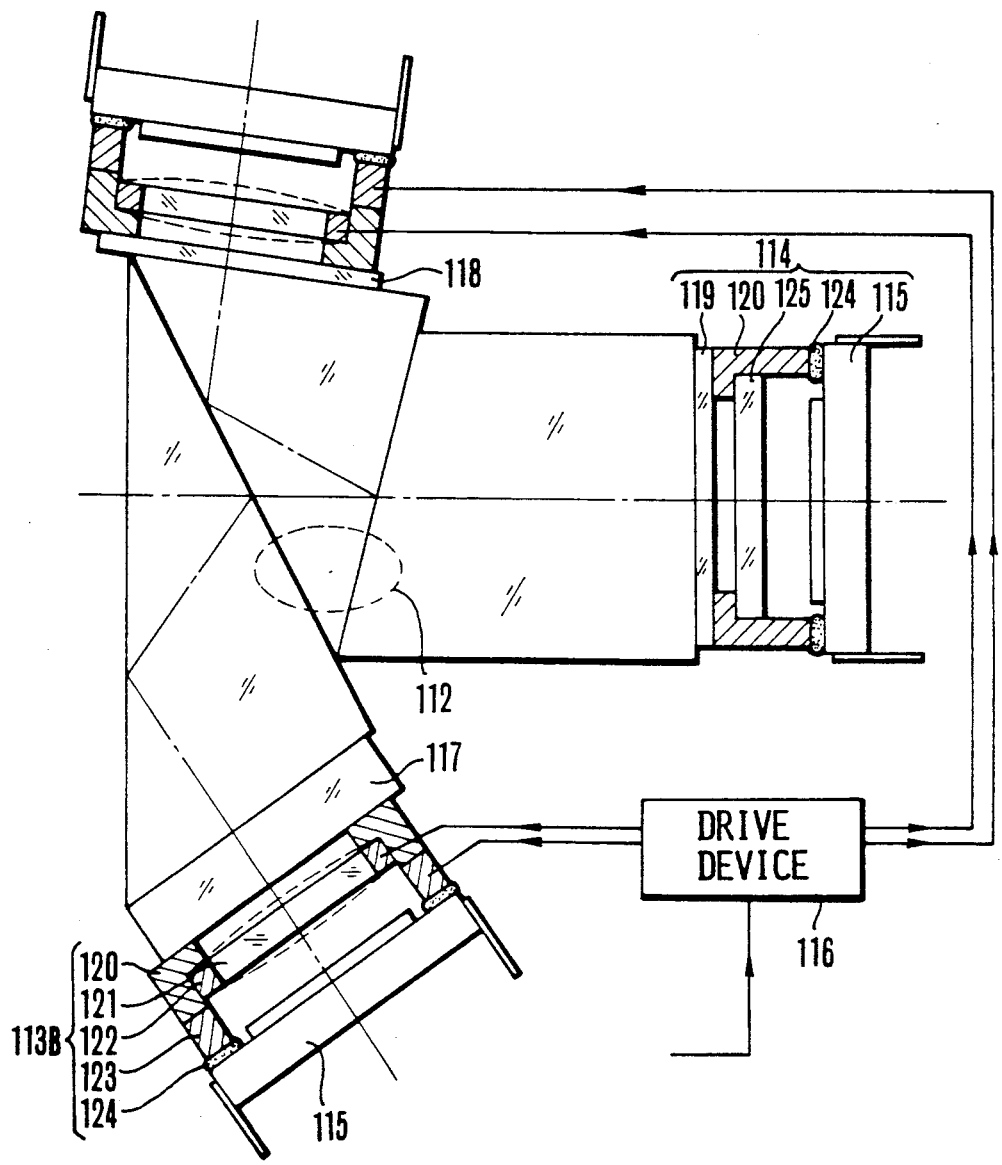
FIG. 5 illustrates the details of the prism and the associated parts therewith shown in FIG. 4.

FIG. 4 is a schematic view of a third embodiment of the invention, and FIG. 5 is a view of the details of its prism and the associated parts therewith.

In FIG. 4, reference numeral 100 denotes an objective lens for forming an image of an object on the solid-state image pickup element. Reference numeral 102 denotes a first lens group movable for focusing. Reference numerals 103 and 104 denote respectively a variator lens group and a compensator lens group constituting a zoom section which varies the magnification by moving along an optical axis in association with rotation of a publicly known cam tube 105. Reference numeral 106 denotes a diaphragm. Reference numeral 107 denotes a master lens.

An image-bearing light beam having passed through the objective lens 100 is split into three color parts, i.e., blue, red and green, by a color separation prism 112. Correction units 113R and 113B having the function of varying the magnification are provided in two channels of red and blue. A holder unit 114 fixedly carries an image pickup element for the reference or green channel. Incidentally, the solid-state image pickup elements 115 are fastened to the respective units, i.e., the correction units 113R and 113B and the holder unit 114, by an adhesive agent or molten metal.

The operative positions of the focusing lens group and each lens group of the zoom section and the diaphragm blades are detected by respective detecting devices 108, 109 and 110. Concretely speaking, these devices are encoders. It is to be noted that instead of this encoder, a potentiometer may be used. The outputs of all the detecting devices 108, 109 and 110 are sent to a computing device 111. The computing device 111 computes the amount of lateral chromatic aberration inherent in the objective lens which changes depending on the focus information, zoom information and the aperture information and produces a correction signal for the magnifications of the red channel and the blue channel.

This correction signal is sent to a correction unit drive device 116 of the camera side. The drive device 116 drives the correction units of the red channel and the blue channel in accordance with the correction signal output from the computing device 111. And, the magnification is changed by a certain amount to correct the lateral chromatic aberration the objective lens has. Thus, an image of right registration can be obtained.

FIG. 5 shows the details of the prism of FIG. 4 and the associated parts therewith.

The color separation prism is constructed from prism elements 112 having dichroic coatings and trimming filters adhered to the exit faces of the respective prism elements. Reference numeral 117 denotes the blue trimming filter for transmitting only blue light. Reference numeral 118 denotes the red trimming filter for transmitting only red light. Reference numeral 119 is the green trimming filter for transmitting only green light.

The light beam having passed through the objective lens 110 enters the color separation prism, is split into the blue, red and green parts by the prism elements 112, which, after having passed through the respective trimming filters 117, 118 and 119, focus spectrally distinguished images on the respective solid-state image pickup elements 115. It should be pointed out here that if the objective lens 100 has lateral chromatic aberration, the spectrally divided three images get different sizes from one another. Hence, the before-described registration error is produced.

Those parts which are denoted by reference numerals 120 to 123 in FIG. 5 constitute the correction unit 113B. The outer frame 120 is fixedly secured to the trimming filter or the prism base in order to stably hold the image pickup element 115 in unison with the color separation prism. The correction lens unit 121 is able to vary the refractive power. The piezoelectric element 122 of tubular shape is able to change its inner diameter when a voltage is applied thereto. Incidentally, the correction lens unit 121 is formed by a transparent elastic body of material such as silicone rubber or ethylenepropylene rubber. Under the condition that no voltage is applied to the piezoelectric element 122, the correction lens unit 121 has almost no power. Meanwhile, as varying voltages are applied on the piezoelectric element 122, the inner diameter of the tube varies. For example, when the inner diameter decreases, the surfaces of the correction lens unit 121 become convex as shown by dashed lines in FIG. 5, getting a positive refractive power. By this effect, the magnification of one channel can be controlled independently. Conversely when the inner diameter of the piezoelectric element 122 increases, the correction lens unit 121 has a negative refractive power, as a matter of course.

In general, at the same time that the magnification changes, shifting of the image forming position occurs too. If this shifting amount is within the depth of focus, there is no problem. In a case where it falls outside the depth of focus, a tracking error arises. Therefore, its correction has also to be made. For this purpose, there is provided a tracking correction member 123 constructed with a piezoelectric element and connecting the outer frame 120 with the image pickup element 115. Reference numeral 124 denotes an adhesive agent or molten metal.

Since the correction of the registration may be done by correcting the difference from one reference channel, the green channel is treated as the reference channel and, therefore, given no refractive power varying action. For the green channel, the fixed outer frame 120 and the glass plate 125 are used. The glass plate 125 equalizes the length of the optical path to that of the other two channels.

Next, the operation of FIG. 5 is described.

Based on the correction signal for the lateral chromatic aberration of the objective lens system being sent from the computing device 111, the correction unit drive device 116 computes the amount of correction of the magnification of each channel and produces an output in the form converted into the voltage to be applied to the piezoelectric element, thus driving the piezoelectric element 122 of each channel. Also, the shifted amount of the image forming position resulting from the change of the magnification is at the same time computed by the drive device 116 and is applied as the voltage proportional to the amount of correction of tracking to the piezoelectric element 123. As the piezoelectric element 122 or 123 expands or contracts, the image pickup element 115 follows up the shifting of the image plane of sharp focus.

By such an operation as described above, the lateral chromatic aberration the objective lens system has is corrected. Thus, a good image of right registration is obtained.

It should be noted that the signal to be inputted to the drive device 116 is not necessarily the signal from the objective lens system. It may be external information, for example, what is manipulated by the human being while viewing the picture on the monitor, or the information representing the difference of the size of each channel as sensed by photographing a chart image. The correction lens made of transparent elastic material and its ability to vary the refractive power are mentioned in Japanese Laid-Open Patent Application No. Sho 60-144703 and others. Further, as the variable refractive power lens, not only the elastic lens, but also a lens of $LiNbO_3$ crystal which changes its refractive index depending on the voltage applied thereto, or an assembly of two aspherical elements upon lateral offsetting to vary the refractive power disclosed in Japanese Patent Publication No. Sho 43-10034, may be used.

Figure 6:
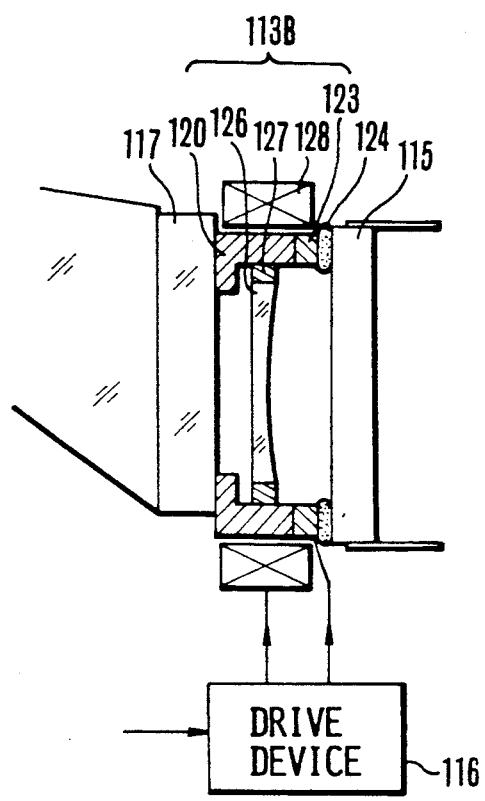
FIG. 6 illustrates a fourth embodiment of the invention.

FIG. 6 shows a fourth embodiment of the invention. The construction of only the correction unit 113B is shown. Reference numeral 120 is an outer frame. A lens 126 of weak refractive power is fixedly secured to a magnetic body 127 of tubular shape. The magnetic body 127 can slide inside the outer frame 120. A coil 128 works as an electromagnet.

As a current flows through the coil 128, the magnetic field varies according to its current amount, causing the magnetic body 127 and the lens 126 to move along the inner surface of the outer frame 120, while changing the magnification. The work of the piezoelectric element 123 is similar to that in the third embodiment.

In the case of the fourth embodiment, it is desirable that even in the reference channel, a similar lens to the lens 126 is put instead of the glass plate 125.

As the moving means for the lens 126, it is also possible to use the method of driving a cam or helicoid screw by an electric motor.

Though, in the foregoing embodiment, the action of the piezoelectric element 123 has been described in connection with the correction of the shifting of the image plane with variation of the magnification, this idea may be easily expanded even to the focusing of the objective lens, the correction of the longitudinal chromatic aberration with zooming. Further, for the correction of the shift of image plane, it is needless to say that the piezoelectric element may be replaced by an electric motor or like drive source.

It should be noted that, though in the embodiment the shift correction of the image plane has been done by moving the image pickup element, it is also possible that the lens 126 is divided into a plurality of elements as arranged to move in differential relation so that, like a zoom lens, while varying the magnification, the position of the image plane is maintained constant. Further, the maintenance of the constant position of the image plane may otherwise be made by simultaneously varying the axial thickness of the lens having an elasticity.

As has been described above, according to the invention, use is made of three correction units arranged behind the color separation prism in the respective paths of the three different color components to change the magnifications of all the channels depending on the lateral chromatic aberration of the objective lens system. Thus, the lateral chromatic aberration of the objective lens system is dynamically corrected. In such a way, it is made possible to get a television picture of good registration.

According to the invention, each channel can be dynamically corrected independently of the others. Hence, the registration not only is possible to correct with high accuracy, but also it is made possible to realize a television camera of high performance at low cost without using expensive glass or increasing the number of lenses, because the objective lens system may be corrected for aberrations at as high a level as in the prior art.

What is claimed is:

1. A color television camera system comprising:
an objective lens having chromatic aberrations;
splitting means for splitting light having passed through said objective lens into at least first and second color components;
first solid-state image pickup means for picking up a first image having said first color component;
second solid-state image pickup means for picking up a second image having said second color component; and
first light refracting means arranged in between said splitting means and said first solid-state image pickup means and having such an optical power that the size of said first image is made substantially coincident with the size of said second image.

2. A color television camera system according to claim 1, further comprising second light refracting means arranged in between said splitting means and said second solid-state image pickup means and having the same optical power as that of said first light refracting means, the distance between said first solid-state image pickup means and said first light refracting means being different from the distance between said second solid-state image pickup means and said second light refracting means.

3. A color television camera system according to claim 1, further comprising second light refracting means arranged in between said splitting means and said second solid-state image pickup means and having an optical power different from that of said first light refracting means.

4. A color television camera system according to claim 1, further comprising means for moving said first light refracting means along an optical axis.

5. A color television camera system according to claim 1, wherein said objective lens has a lens group movable for zooming, and further comprising detecting means for detecting the position of said lens group and means for moving said first light refracting means along an optical axis on the basis of an output of said detecting means.

6. A color television camera system according to claim 1, wherein said objective lens has a lens group movable for zooming, and further comprising detecting means for detecting the position of said lens group and means for varying the optical power of said first light refracting means on the basis of an output of said detecting means.

7. A color television camera system according to claim 1, satisfying the following condition:

$$3000 \text{ mm} > |f| > 200 \text{ mm}$$

where f is a focal length of said first light refracting means.

8. A color television camera for converting an image formed by an objective lens into video signals comprising:
   splitting means for splitting light having passed through said objective lens into a plurality of color components;
   a plurality of solid-state image pickup means for picking up the respective images corresponding to said plurality of color components; and
   first light refracting means arranged in between said splitting means and at least one of said plurality of solid-state image pickup means, and having such an optical power that the sizes of the images having the respective color components are made substantially coincident with one another.

9. A color television camera according to claim 8, further comprising second light refracting means arranged in between said splitting means and another of said plurality of solid-state image pickup means and having the same optical power as that of said first light refracting means, the distance between said first light refracting means and said one of said plurality of solid-state image pickup means differs from the distance between said second light refracting means and said other of said plurality of solid-state image pickup means.

10. A color television camera according to claim 8, further comprising means for moving said first light refracting means along an optical axis.

11. A color television camera according to claim 8, wherein said objective lens has a lens group movable for zooming, and further comprising detecting means for detecting the position of said lens group and means for moving said first light refracting means along an optical axis on the basis of an output of said detecting means.

12. A color television camera according to claim 8, wherein said objective lens has a lens group movable for zooming, and further comprising detecting means for detecting the position of said lens group and means for varying the optical power of said first light refracting means on the basis of an output of said detecting means.

13. A color television camera according to claim 8, satisfying the following condition:

$$3000 \text{ mm} > |f| > 200 \text{ mm}$$

where f is a focal length of said first light refracting means.

14. A color television camera for converting an image formed by an objective lens having chromatic aberrations into video signals, comprising:
    splitting means for splitting light having passed through said objective lens into first, second and third color components;
    first, second and third image pickup means for picking up the respective images corresponding to said first, second and third color components;
    first light refracting means arranged in between said splitting means and said first image pickup means and having such an optical power that the size of the image of said first color component substantially coincides with the size of the image of said third color component; and
    second light refracting means arranged in between said splitting means and said second image pickup means and having such an optical power that the size of the image of said second color component substantially coincides with the size of the image of said third color component.

15. A color television camera according to claim 14, wherein said first light refracting means moves along an optical axis.

16. A color television camera according to claim 14, wherein said first, second and third image pickup means each are a solid-state image pickup element.

* * * * *

UNITED STATES PATENT AND TRADEMARK OFFICE
CERTIFICATE OF CORRECTION

PATENT NO. : 5,086,338

DATED : February 4, 1992

INVENTOR(S) : Fumiaki USUI

It is certified that error appears in the above-identified patent and that said Letters Patent is hereby corrected as shown below:

On the Title page, item

[56] References Cited:

FOREIGN PATENT DOCUMENTS

"1810034 4/1943 Japan" should read --18-10034 4/1943 Japan--;
"61187485 8/1986 Japan" should read --61-187485 8/1986 Japan--;
"1166688 6/1989 Japan" should read --1-166688 6/1989 Japan--; and
"1204588 8/1989 Japan" should read --1-204588 8/1989 Japan--.

COLUMN 3:
  Line 54, "at" should read --to--;
  Line 60, "much" should be deleted;
  Line 65, "that" should read --for--; and "is virtually not" should read --to be virtually undetectable,--; and
  Line 66, "appreciable," should be deleted.

COLUMN 4:
  Line 23, "in the" and "order" should be deleted;
  Line 25, "made" should be deleted; and
  Line 63, "made" should be deleted.

COLUMN 5:
  Line 4, "necessary to alter," should read --altered,-- and "be" should read --be provided--;
  Line 5, "a" should be deleted;
  Line 10, "gets" should read -- performs--;
  Line 24, "associated parts" should read --parts associated--;
  Line 62, "of" should read --in-- and "side" should be deleted;
  Line 67, "aberration" should read --aberration of-- and "has" should be deleted; and
  Line 68, "of right" should read --with correct--.

UNITED STATES PATENT AND TRADEMARK OFFICE
CERTIFICATE OF CORRECTION

PATENT NO. : 5,086,338

DATED : February 4, 1992

INVENTOR(S) : Fumiaki USUI

It is certified that error appears in the above-identified patent and that said Letters Patent is hereby corrected as shown below:

COLUMN 6:
    Line 2, "associated parts" should read --parts associated--; and
    Line 19, "get" should read --are--.

COLUMN 7:
    Line 16, "of right" should read --with correct--;
    Line 32, "upon" should read --with-- and "offsetting" should read --offset--;
    Line 49, "similar lens" should read --lens similar--;
    Line 50, "put" should read --provided--;
    Line 61, "of" should read --of the--;
    Line 66, "that" should read --for--; and
    Line 67, "is" should read --to be-- and "as" should be deleted.

COLUMN 8:
    Line 14, "made" should be deleted and "of" should read --with correct--;
    Line 15, "good" should be deleted;
    Line 18, "not only is possible to correct" should read --can be corrected--; and
    Line 19, "but also" should read --and-- and "made" should be deleted.

Signed and Sealed this

Fifteenth Day of June, 1993

Attest:

MICHAEL K. KIRK

Attesting Officer      Acting Commissioner of Patents and Trademarks